United States Patent
Song et al.

(10) Patent No.: US 10,487,248 B2
(45) Date of Patent: Nov. 26, 2019

(54) ADHESIVE COMPOSITION FOR POLARIZING PLATE

(71) Applicant: DONGWOO FINE-CHEM CO., LTD., Jeollabuk-do (KR)

(72) Inventors: In Kyu Song, Gyeonggi-do (KR); Jun Hee Sung, Incheon (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 134 days.

(21) Appl. No.: 15/540,071

(22) PCT Filed: Dec. 8, 2015

(86) PCT No.: PCT/KR2015/013377
§ 371 (c)(1),
(2) Date: Jun. 27, 2017

(87) PCT Pub. No.: WO2016/108460
PCT Pub. Date: Jul. 7, 2016

(65) Prior Publication Data
US 2017/0362476 A1 Dec. 21, 2017

(30) Foreign Application Priority Data
Dec. 29, 2014 (KR) .................. 10-2014-0192083

(51) Int. Cl.
*C09J 133/14* (2006.01)
*G02B 1/14* (2015.01)
*G02B 5/30* (2006.01)
*G02F 1/1335* (2006.01)

(52) U.S. Cl.
CPC .............. *C09J 133/14* (2013.01); *G02B 1/14* (2015.01); *G02B 5/3025* (2013.01); *G02F 1/133528* (2013.01); *G02F 2202/28* (2013.01)

(58) Field of Classification Search
CPC .............. C09J 133/14; G02F 1/133528; G02F 2202/28; G02B 1/14; G02B 5/3025
USPC ........................................................ 428/1.5
See application file for complete search history.

(56) References Cited

FOREIGN PATENT DOCUMENTS

| JP | H11-29683 | A |   | 2/1999 |   |
|---|---|---|---|---|---|
| JP | 3668997 | B2 |   | 7/2005 |   |
| JP | 2006265349 | A | * | 10/2006 |   |
| JP | 2013-178507 | A |   | 9/2013 |   |
| KR | 20120091549 | A | * | 8/2012 |   |
| KR | 10-2012-0121860 | A |   | 11/2012 |   |
| KR | 10-2013-0010868 | A |   | 1/2013 |   |
| KR | 20130063446 | A | * | 6/2013 |   |
| KR | 10-2014-0120063 | A |   | 10/2014 |   |
| KR | 20140120063 | A | * | 10/2014 | .......... C09J 133/066 |

OTHER PUBLICATIONS

Translation of KR 20140120063, Oct. 13, 2014. (Year: 2014).*
Translation of JP 2006-265349, Oct. 5, 2006. (Year: 2006).*
Translation of KR 2013-0063446, Jun. 14, 2013. (Year: 2013).*
Translation of KR 2012-0091549, Aug. 20, 2012. (Year: 2012).*
International Search Report for PCT/KR2015/013377.

* cited by examiner

*Primary Examiner* — Hui H Chin
(74) *Attorney, Agent, or Firm* — The PL Law Group, PLLC

(57) ABSTRACT

An adhesive composition for a polarizing plate is adapted to exhibit a variation in relaxation modulus of an adhesive layer in a range of 75% to 95% before and after leaving the same at a temperature of −20° C. to 0° C. for 4 hours, such that it is possible to remarkably improve thermal-shock durability of the polarizing plate, and suppress a damage of the polarizing plate in a thermal-shock durability test, while maintaining excellent adhesiveness.

10 Claims, No Drawings

ADHESIVE COMPOSITION FOR POLARIZING PLATE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/013377, filed Dec. 8, 2015, which claims priority to the benefit of Korean Patent Application No. 10-2014-0192083 filed in the Korean Intellectual Property Office on Dec. 29, 2014, the entire contents of which are incorporated herein by reference.

BACKGROUND OF THE INVENTION

1. Field of the Invention

The present invention relates to an adhesive composition for a polarizing plate.

2. Description of the Related Art

A variety of image display devices such as a liquid crystal display (LCD), an electroluminescent (EL) display, a plasma display panel (PDP), a field emission display (FED), or the like, include a polarizing plate. The polarizing plate generally includes a polarizer having a polyvinylalcohol (PVA) film and containing an iodine compound or dichroic polarizing material adsorbed and oriented thereon. The polarizer includes polarizer protective films sequentially laminated on one surface thereof, and has a multi-layered structure in which a polarizer protective film, an adhesive layer adhered to a liquid crystal cell and a release film are sequentially laminated on the other surface thereof.

The polarizer included in the polarizing plate having the above-described structure, may be manufactured by a complicated process including swelling, dyeing, stretching, cross-linking, washing and drying a PVA film. Stress occurs in the complicated process or during handling, and cracks are easily generated in the stretched polarizer in a direction parallel to a stretching direction (MD direction) thereof. In addition, the polarizing plate undergoes contraction and expansion repeatedly under high temperature and low temperature repeating environments to cause stress, and thereby cracks are easily generated therein.

In particular, as various image display apparatuses gradually become large, the size of the polarizer and polarizing plate used for the same is also increased. Accordingly, it leads to more unfavorable management during handling in the processes, and strain occurred under the high temperature and low temperature repeating environments is more increased. Therefore, an improved polarizing plate with excellent durability is required.

As a method for providing durability to the polarizing plate, Japanese Patent Laid-Open Publication No. 11-29683 discloses a method for improving toughness of a PVA film itself by adding starch and saccharides during production of the PVA film. However, such a PVA film containing starch and saccharides added thereto is not proper for optical materials and, when this film is swollen, the above components may partially flow out, and thus cause a problem of deterioration in physical properties.

SUMMARY

In is an object of the present invention to provide an adhesive composition for a polarizing plate which is capable of remarkably improving thermal-shock durability of the polarizing plate.

Another object of the present invention is to provide a polarizing plate with remarkably improved thermal-shock durability, and an image display device including the same.

The above objects of the present invention will be achieved by the following characteristics:

(1) An adhesive composition for a polarizing plate, which is adapted to exhibit a variation in relaxation modulus of an adhesive layer in a range of 75% to 95% before and after leaving the same at a temperature of −20° C. to 0° C. for 4 hours.

(2) The adhesive composition according to the above (1), wherein the adhesive layer has a thickness of 5 to 50 μm.

(3) The adhesive composition according to the above (1), which is used to adhere an acryl-based polarizer protective film to a liquid crystal panel.

(4) The adhesive composition according to the above (1), wherein the adhesive layer has a variation in relaxation modulus of 40 to 70% before and after leaving the same at a temperature of 70° C. for 4 hours.

(5) A polarizing plate comprising an adhesive layer which is formed on at least one surface thereof using the adhesive composition according to the above (1).

(6) The polarizing plate according to the above (5), comprising a protective film attached to at least one surface of a polarizer and an adhesive layer formed on the protective film on at least one side, wherein the protective film is an acryl film.

(7) An image display device comprising the polarizing plate according to the above (5).

The adhesive composition of the present invention may be used for adhesion of a polarizing plate, so as to remarkably improve the thermal-shock durability of the polarizing plate. Accordingly, it is possible to suppress a damage of the polarizing plate in a thermal-shock durability test, while maintaining excellent adhesiveness even after exposure to severe conditions for a long time.

DETAILED DESCRIPTION

The present invention discloses an adhesive composition for a polarizing plate, which is adapted to exhibit a variation in relaxation modulus of an adhesive layer in a range of 75% to 95% before and after leaving the same at a temperature of −20° C. to 0° C. for 4 hours, such that it is possible to remarkably improve thermal-shock durability of the polarizing plate, and suppress a damage of the polarizing plate in a thermal-shock durability test, while maintaining excellent adhesiveness.

Hereinafter, the present invention will be described in detail.

The adhesive composition for a polarizing plate of the present invention may exhibit a variation in relaxation modulus of an adhesive layer in a range of 75% to 95% before and after leaving the same at a temperature of −20° C. to 0° C. for 4 hours.

If the variation in relaxation modulus of the adhesive layer is less than 75% exhibited by the adhesive composition before and after leaving the same at a temperature of −20° C. to 0° C. for 4 hours, thermal-shock durability of the polarizing plate may be deteriorated when the composition is used for adhering the polarizing plate to a liquid crystal panel, and thereby causing a damage of the polarizing plate in a thermal-shock durability test. Further, when the variation exceeds 95%, adhesive performance may be considerably decreased.

For relaxation of stress, when applying constant strain $\gamma_0$ and defining the stress after a predetermined time t as $\sigma(t)$, it may be represented by $\sigma(t)=\gamma_0 G(t)$. In this disclosure, $G(t)$ refers to as the relaxation modulus.

The variation in relaxation modulus may be determined by any conventional method.

Specifically, for example, an adhesive composition is applied to a release film, followed by curing the same to form an adhesive layer having a thickness of 5 μm to 50 μm, preferably, 15 μm to 30 μm. Then, only the adhesive layer is separated from the release film to prepare a specimen in a round shape having a diameter of 15 to 30 mm. Thereafter, for the specimen, an initial relaxation modulus at a temperature of −20° C. to 0° C. is measured using a rheometer (for example, MCR-302 available from Anton Paar Co.), while setting a normal force to be 1N and a shear stress to be 70 kPa. Further, the relaxation modulus is measured after leaving the specimen at a temperature of −20° C. to 0° C. for 4 hours. From these measured values, a variation therebetween may be obtained.

If the thickness of the adhesive layer is less than 5 μm or exceeds 50 μm, a reliability of the measured variation in relaxation modulus is reduced, and hence a relationship between the variation in relaxation modulus and the thermal-shock durability may be changed. That is, if the thickness is within the range of 5 μm to 50 μm, such a relationship between the variation in relaxation modulus and the thermal-shock durability may become more notably reliable.

Further, the adhesive layer may have a variation in relaxation modulus of 40% to 70% before and after leaving the same at a temperature of 70° C. for 4 hours, when measuring by the same procedure as described above. For the adhesive composition exhibiting a variation in relaxation modulus of the adhesive layer in a range of 40% to 70% before and after leaving the same at a temperature of 70° C. for 4 hours, the thermal-shock durability and heat-resistant durability may be excellent. Therefore, when using the adhesive composition in adhesion of a polarizing plate to a liquid crystal panel, it may attain excellent effects of preventing cracks, delamination, or the like of the polarizing plate and liquid crystal panel.

With regard to the adhesive composition of the present invention, a constitutional composition of individual components is not particularly limited so long as it satisfies a desired variation in relaxation modulus as described above. For example, an acryl copolymer, cross-linking agent and silane coupling agent may be included.

The acryl copolymer refers to an adhesive resin, and may include a copolymer of a (meth)acrylate monomer having an alkyl group with 1 to 12 carbon atoms, and a polymerizable monomer having a functional group possibly cross-linked with a cross-linking agent. Herein, (meth)acrylate means both of acrylate and methacrylate.

(Meth)acrylate monomer having an alkyl group with 1 to 12 carbon atoms may include, for example, n-butyl(meth)acrylate, 2-butyl(meth)acrylate, t-butyl(meth)acrylate, 2-ethylhexyl(meth)acrylate, ethyl(meth)acrylate, methyl(meth)acrylate, n-propyl(meth)acrylate, isopropyl(meth)acrylate, pentyl(meth)acrylate, n-octyl(meth)acrylate, isooctyl(meth)acrylate, nonyl(meth)acrylate, decyl(meth)acrylate, lauryl(meth)acrylate, or the like. Among these, n-butylacrylate, 2-ethylhexylacrylate or a mixture thereof is preferably used. These compounds may be used alone or in combination of two or more thereof.

The (meth)acrylate monomer having an alkyl group with 1 to 12 carbon atoms may be included in an amount of 96 to 99% by weight ('wt. %') to 100 wt. % of total monomer used for preparing an acryl copolymer. If a content of the monomer is less than 96 wt. %, adhesiveness is not sufficient and a problem of increasing a peel-off strength may be caused. On the other hand, when the content of the monomer exceeds 99 wt. %, cohesiveness may be decreased to deteriorate durability. More preferably, the monomer is included in an amount of 96 to 98 wt. %.

The polymerizable monomer having a cross-linkable functional group is a component to reinforce cohesiveness or adhesive strength of the adhesive composition through chemical bonding to thus endow durability and cutting ability, and may include, for example, a monomer having an amide group, a monomer having a carboxyl group, a monomer having a hydroxyl group, or the like.

The monomer having an amide group may include, for example, (meth)acrylamide, N-isopropyl acrylamide, N-tert-butyl acrylamide, etc., which may be used alone or in combination of two or more thereof.

The monomer having a carboxyl group may include, for example: mono-valent acids such as (meth)acrylic acid, crotonic acid, etc.; di-valent acids such as maleic acid, itaconic acid, fumaric acid, etc. and monoalkylesters thereof; 3-(meth)acryloylpropionic acid; a ring-opening adduct of succinic anhydride of 2-hydroxyalkyl (meth)acrylate having an alkyl group with 2 to 3 carbon atoms, a ring-opening adduct of succinic anhydride of hydroxyalkyleneglycol (meth)acrylate having an alkylene group with 2 to 4 carbon atoms, a compound prepared by ring-opening addition of succinic anhydride to a caprolactone adduct of 2-hydroxyalkyl (meth)acrylate having an alkyl group with 2 to 3 carbon atoms, or the like, which may be used alone or in combination of two or more thereof.

The monomer having a hydroxyl group may include, for example, 2-hydroxyethyl (meth)acrylate, 2-hydroxypropyl (meth)acrylate, 2-hydroxybutyl (meth)acrylate, 4-hydroxybutyl (meth)acrylate, 6-hydroxylhexyl (meth)acrylate, 2-hydroxyethyleneglycol (meth)acrylate, 2-hydroxylpropyleneglycol (meth)acrylate, hydroxylalkyleneglycol (meth)acrylate having an alkylene group with 2 to 4 carbon atoms, which may be used alone or in combination of two or more thereof.

In addition to the above monomers, the acryl copolymer may further include any other polymerizable monomers known in the related art within a range with no deterioration in adhesiveness, for example, in a content of 10 wt. % or less.

Methods for preparation of a copolymer are not particularly limited but the copolymer may be prepared by any conventional polymerization method commonly used in the related art such as bulk polymerization, solution polymerization, emulsion polymerization or suspension polymerization. Solution polymerization is preferably used. Further, solvents, polymerization initiators, chain transfer agents for controlling a molecular weight, or the like, commonly used in the polymerization, may also be included.

The acryl copolymer may have a weight average molecular weight (in terms of polystyrene, Mw) measured by gel permeation chromatography (GPC) of 200,000 to 1,500,000, and preferably, 400,000 to 1,200,000. If the molecular weight is less than 200,000, coagulation between copolymers is insufficient to cause a problem in bonding durability. On the other hand, when the molecular weight exceeds 1,500,000, it may need a great amount of diluted solvent in order to ensure desired workability during coating.

The cross-linking agent is a component to suitably cross-link the copolymer to thus reinforce cohesiveness of the adhesive, and may include isocyanate known in the related art without particular restriction thereof. Preferably, an isocyanate-based cross-linking agent is used.

The isocyanate-based cross-linking agent may include, for example: diisocyanate compounds such as tolylene diisocyanate, xylene diisocyanate, 2,4-diphenymethane diisocyanate, 4,4-diphenylmethane diisocyanate, hexamethylene diisocyanate, isophorone diisocyanate, tetramethylene xylene diisocyanate, naphthalene diisocyanate, etc.; adduct obtained by reacting 1 mole of polyalcohol compound such as trimethylolpropane with 3 moles of the diisocyanate compound; self-condensed isocyanurate of 3 moles of the diisocyanate compound; burette body obtained by condensation of diisocyanurate urea resulting from 2 moles among 3 moles of the diisocyanate compound together with the remaining 1 mole of diisocyanate; polyfunctional isocyanate compounds having three functional groups such as triphenylmethane triisocyanate, methylenebistriisocyanate, etc., or the like, which may be used alone or in combination of two or more thereof.

Further, in addition to the polyfunctional isocyanate cross-linking agent, a melamine-based compound such as hexamethylolamine, hexamethoxy methylmelamine, hexabutoxy methylmelamine, etc. may be further used alone or in combination of two or more thereof.

The isocyanate-based cross-linking agent may be included in an amount of 0.1 to 15 parts by weight ('wt. parts') to 100 wt. parts of the acryl copolymer in terms of solid content. If a content of the cross-linking agent is less than 0.1 wt. part, cohesiveness is decreased due to lack of cross-linking degree, to hence cause a reduction in durability such as delamination, and affect cutting ability. When the content of the cross-linking agent exceeds 15 wt. parts, due to excessive cross-linking reaction, it may be difficult to reduce a residual stress.

Types of the silane coupling agent are not particularly limited but may include, for example, vinyl chlorosilane, vinyl trimethoxysilane, vinyl triethoxysilane, 2-(3,4-epoxycyclohexyl)ethyl trimethoxysilane, 3-glycidoxypropyl trimethoxysilane, 3-glycidoxypropylmethyl diethoxysilane, 3-glycidoxypropyl diethoxysilane, 3-glycidoxypropyl triethoxysilane, p-styryl trimethoxysilane, 3-methacryloxypropyl triethoxysilane, 3-methacryloxypropyl trimethylsilane, 3-methacryloxypropyl dimethoxysilane, 3-methacryloxypropylmethyl diethoxysilane, 3-acryloxypropyl trimethoxysilane, N-2-(aminoethyl)-3-aminopropylmethyl dimethoxysilane, N-2-(aminoethyl)-3-aminopropyl trimethoxysilane, N-2-(aminoethyl)-3-aminopropylmethyl triethoxysilane, 3-aminopropyl trimethoxysilane, 3-aminopropyl triethoxysilane, 3-triethoxysilyl-N-(1,3-dimethylbutylidene)propylamine, N-phenyl-3-aminopropyl trimethoxysilane, 3-chloropropyl trimethoxysilane, 3-mercaptopropylmethyl dimethoxysilane, 3-mercaptopropyl trimethoxysilane, bis(triethoxysilylpropyl)tetrasulfide, 3-isocyanatopropyl triethoxysilane, or the like. These compounds may be used alone or in combination of two or more thereof.

The silane coupling agent may be included in an amount of 0.001 to 10 wt. parts, and preferably, 0.005 to 5 wt. parts to 100 wt. parts of the acryl copolymer, in terms of solid content. When the content of the coupling agent exceeds 10 wt. parts, durability may be deteriorated.

Other than the above-described components, in order to control adhesiveness, cohesiveness, viscosity, elastic modulus, glass transition temperature or the like required according to uses thereof, the adhesive composition may further include alternative additives such as a resin for providing adhesiveness, antioxidant, antistatic agent, anti-corrosive agent, leveling agent, surface lubricant, dye, pigment, defoaming agent, filler, photo-stabilizer, etc.

The adhesive composition of the present invention is used for adhesion of a polarizing plate to a liquid crystal panel. More particularly, the polarizing plate generally includes a polarizer and polarizer protective films attached to both surfaces thereof, and the adhesive composition may be used for adhering the polarizer protective films to a liquid crystal panel. When the polarizer protective film includes an acryl-based protective film, and specifically, polymethyl (meth)acrylate, it is preferable in terms of maximizing an improvement in thermal-shock durability.

Further, the present invention provides a polarizing plate including an adhesive layer which is formed on at least one surface thereof using the above-described adhesive composition.

The polarizing plate of the present invention may have an adhesive layer formed of the above-described adhesive composition, thus exhibiting significantly improved thermal-shock durability.

A thickness of the adhesive layer is not particularly limited but may range from 5 μm to 50 μm. If the thickness thereof is less than 5 μm, surface adhesion is not sufficient and thus causes delamination at adhered portions. When the thickness thereof exceeds 50 μm, solvent may still remain in the adhesive layer to cause a problem such as outgassing, delamination at the adhered portions, etc. Preferably, the adhesive layer has a thickness of 15 μm to 30 μm.

The polarizing plate of the present invention may include a polarizer and a protective film attached to at least one surface of the polarizer.

The polarizer may be any polarizer commonly used in the related art, which is manufactured by a process including swelling, dyeing, cross-linking, drawing, washing and drying a polyvinyl alcohol-based film such as a polyvinyl alcohol film, a dehydrated polyvinyl alcohol film, dehydrochlorinated polyvinyl alcohol film, etc.

A thickness of the polarizer is not particularly limited but, for example, may range from 10 to 150 μm. The protective film used herein may be any film so long as the film has excellent properties such as transparency, mechanical strength, thermal stability, moisture-shielding properties, isotropic properties, or the like. Specifically, polyester films such as polyethylene terephthalate, polyethylene isophthalate, polybutylene terephthalate, etc.; cellulose films such as diacetylcellulose, triacetylcellulose, etc.; polycarbonate films; acryl films such as polymethyl (meth)acrylate, polyethyl (meth)acrylate, etc.; styrene films such as polystyrene, acrylonitrile-styrene copolymer, etc.; polyolefin films such as cycloolefin, cycloolefin copolymer, polynorbornene, polypropylene, polyethylene, ethylene-propylene copolymer, etc.; vinyl chloride films; polyamide films such as nylon, aromatic polyamide, etc.; imide films; sulfone films; polyetherketone films; polyphenylene sulfide films; vinyl alcohol films; vinylidene chloride films; vinyl butyral films; allylate films; polyoxymethylene films; urethane films; epoxy films; silicon films, or the like, may be used. Among these, in aspects of polarization characteristics and durability, the cellulose film or acryl film is preferably used. The acryl film is the most preferably used in an aspect of maximizing an improvement in thermal-shock durability due to stress relaxation of the adhesive layer. Further, the protective film may also have optical compensation performance such as phase retardation.

A thickness of the protective film is not particularly limited but, for example, may range from 10 to 200 μm, an preferably, from 10 to 150 μm.

When using in the polarizing plate, the protective film may be bonded to one surface of the polarizer. In order to enhance a bonding strength, the surface to be bonded to the polarizer may be treated by any process for easy bonding.

Such a process for easy bonding is not particularly limited so long as it can enhance adhesion between the polarizer and the protective film, and may include, for example, drying processes such as primer treatment, plasma treatment, corona treatment, etc.; chemical treatment such as alkalization (saponification), etc.; low-pressure UV treatment, or the like.

The protective film may be attached to one surface or both surfaces of the polarizer and, if the protective film is attached to only one surface of the polarizer, an optical function layer may be provided on the other surface.

The optical function layer may include, for example, a hard coating layer, phase retardation layer, anti-reflection layer, antistatic layer, etc., however, it is not limited thereto.

The adhesive layer is provided on at least one surface of the polarizing plate. For example, if the protective film is attached to only one surface of the polarizer, the adhesive layer may be provided on the protective film. When the protective film is attached to both surfaces of the polarizer, the adhesive layer may be provided on one surface or both surfaces of the protective films. Further, if the protective film is provided on one surface of the polarizer while an optical function layer is attached to the other surface, the adhesive layer may be provided on the protective film or the optical function layer, but it is not limited thereto.

Further, the present invention provides an image display device including the above-described polarizing plate.

The polarizing plate of the present invention may be applicable to typical liquid crystal display devices, in addition, other various image display devices such as an electroluminescent display device, plasma display device, electroluminescent emission display device, or the like.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Preparative Example 1. Preparation of Acryl Copolymer (A-1)

A monomer mixture including 85 wt. parts of n-butyl acrylate (BA), 8 wt. parts of methyl acrylate (MA) and 2.0 wt. parts of 2-hydroxyethyl acrylate (2-HEA) were introduced into 1 L reactor equipped with a cooling device for easy control of a temperature, in which a nitrogen gas is refluxed. Then, a solvent, that is, 100 wt. parts of acetone was added thereto. Next, purging the nitrogen gas for 1 hour in order to remove oxygen, and then the mixture was maintained at 62° C. After homogenizing the mixture, 0.07 wt. parts of a reaction initiator, that is, azobisisobutyronitrile (AIBN) was introduced into the reactor, followed by a reaction for 6 hours to prepare an acryl copolymer with a weight average molecular weight of about 1,000,000.

Preparative Example 2. Preparation of Acryl Copolymer (A-2)

A monomer mixture including 88.5 wt. parts of n-butyl acrylate (BA), 10.2 wt. parts of ethyl acrylate (EA) and 1.3 wt. parts of 2-hydroxyethyl methacrylate (2-HEMA) were introduced into 1 L reactor equipped with a cooling device for easy control of a temperature, in which a nitrogen gas is refluxed. Then, a solvent, that is, 100 wt. parts of acetone was added thereto. Next, purging the nitrogen gas for 1 hour in order to remove oxygen, and then the mixture was maintained at 62° C. After homogenizing the mixture, 0.07 wt. parts of a reaction initiator, that is, azobisisobutyronitrile (AIBN) was introduced into the reactor, followed by a reaction for 6 hours to prepare an acryl copolymer with a weight average molecular weight of about 1,000,000.

Preparative Example 3. Preparation of Acryl Copolymer (A-3)

A monomer mixture including 98.6 wt. parts of n-butyl acrylate (BA), 1.0 wt. parts of 2-hydroxyethyl acrylate (2-HEA) and 0.4 wt. parts of acrylic acid (AA) were introduced into 1 L reactor equipped with a cooling device for easy control of a temperature, in which a nitrogen gas is refluxed. Then, a solvent, that is, 100 wt. parts of acetone was added thereto. Next, purging the nitrogen gas for 1 hour in order to remove oxygen, and then the mixture was maintained at 62° C. After homogenizing the mixture, 0.07 wt. parts of a reaction initiator, that is, azobisisobutyronitrile (AIBN) was introduced into the reactor, followed by a reaction for 6 hours to prepare an acryl copolymer with a weight average molecular weight of about 1,000,000.

Preparative Example 4. Preparation of Acryl Copolymer (A-4)

A monomer mixture including 46 wt. parts of n-butyl acrylate (BA), 50 wt. parts of 2-ethylhydroxy acrylate (2-EHA) and 4.0 wt. parts of 2-hydroxyethyl acrylate (2-HEA) were introduced into 1 L reactor equipped with a cooling device for easy control of a temperature, in which a nitrogen gas is refluxed. Then, a solvent, that is, 100 wt. parts of acetone was added thereto. Next, purging the nitrogen gas for 1 hour in order to remove oxygen, and then the mixture was maintained at 62° C. After homogenizing the mixture, 0.07 wt. parts of a reaction initiator, that is, azobisisobutyronitrile (AIBN) was introduced into the reactor, followed by a reaction for 6 hours to prepare an acryl copolymer with a weight average molecular weight of about 1,000,000.

Examples and Comparative Examples (1) Adhesive Composition

After mixing such components with such contents as listed in Table 1 below, the mixture was diluted to reach a proper concentration (using ethyl acetate, solid content of 15%) in consideration of coating ability, to prepare an adhesive composition. Herein, the content is defined in part by weight.

TABLE 1

| Section | Acryl copolymer (A) | | Cross-linking agent (B) | | Silane coupling agent (C) | |
|---|---|---|---|---|---|---|
| | Component | Content | Component | Content | component | Content |
| Example 1 | A-1 | 100 | B-1 | 5 | C-1 | 0.5 |
| Example 2 | A-1 | 100 | B-1 | 1 | C-1 | 0.5 |
| Example 3 | A-1 | 100 | B-2 | 5 | C-1 | 0.5 |

TABLE 1-continued

| Section | Acryl copolymer (A) | | Cross-linking agent (B) | | Silane coupling agent (C) | |
|---|---|---|---|---|---|---|
| | Component | Content | Component | Content | component | Content |
| Comparative Example 1 | A-1 | 100 | B-1 | 20 | C-1 | 0.5 |
| Comparative Example 2 | A-1 | 100 | B-1 | 0.1 | C-1 | 0.5 |
| Comparative Example 3 | A-1 | 100 | B-3 | 5 | C-1 | 0.5 |
| Comparative Example 4 | A-2 | 100 | B-1 | 5 | C-1 | 0.5 |
| Comparative Example 5 | A-3 | 100 | B-2 | 5 | C-1 | 0.5 |
| Comparative Example 6 | A-4 | 100 | B-1 | 5 | C-1 | 0.5 |

A-1: Copolymer prepared in Preparative Example 1
A-2: Copolymer prepared in Preparative Example 2
A-3: Copolymer prepared in Preparative Example 3
A-4: Copolymer prepared in Preparative Example 4
B-1: Coronate-L, Japan Urethane Co.
B-2: L-45, Soken Co.
B-3: Epocros WS-500, Nippon Shokubai Co.
C-1: KBM-403, Shietsu Co.

(2) Fabrication of Polarizing Plate
1) Fabrication of Polarizer

A PVA film having a polarization degree of 2,400, a saponification degree of 99.9 mol. % or more and a thickness of 60 μm was stretched by about 5 times according to mono-axial stretching under a dry condition, and immersed in distilled water at 60° C. for 1 minute while maintaining the film in a tension state. Then, the film was immersed in an aqueous solution of iodine/potassium iodide/distilled water in a weight ratio of 0.05/5/100 at 28° C. for 60 seconds. Next, the film was immersed again in an aqueous of potassium iodide/boric acid/distilled water in a weight ratio of 8.5/8.5/100 at 72° C. for 300 seconds, washed with distilled water at 26° C. for 20 seconds, and dried at 65° C., to fabricate a polarizer having a polyvinyl alcohol film and iodine adsorbed thereon. The formed polarizer had a thickness of 25 μm.

2) Fabrication of Polarizing Plate

An aqueous adhesive composition (prepared by adding 3 wt. parts of acetoacetylene modified polyvinyl alcohol resin (Z200, Japan Synthetic chemical Co. Ltd.) and 0.3 wt. part of glyoxal cross-linking agent to 100 wt. parts of water) was applied to both surfaces of the polarizer through spraying to reach a thickness after drying of 0.5 μm. Then, a polymethyl methacrylate protective film (PMMA) having a thickness of 60 μm was bonded to the above polarizer using a nip-roll, followed by drying at 60° C. for 5 minutes, to fabricate a polarizing plate with a size of 100 mm×100 mm.

Each of the adhesive compositions prepared in the examples and comparative examples was applied to a release film coated with a silicon-based release agent, followed by drying at 100° C. for 1 minute to form an adhesive layer having a thickness of 25 μm. Then, the release film coated with the release agent was bonded to the adhesive layer to prepare an adhesive film. After stripping the release film from one surface of the adhesive film, the adhesive layer was adhered to one surface of the polarizing plate. Next, after stripping the release film from the other surface, the adhesive layer was adhered to a glass plate.

Experimental Example

1. Measurement of Variation in Relaxation Modulus of Adhesive Layer

Each of the adhesive compositions prepared in the examples and comparative examples was applied to a release film coated with a silicon-based release agent, followed by drying at 100° C. for 1 minute to form an adhesive layer having a thickness of 25 μm. Then, the release film coated with the release agent was bonded to the adhesive layer to prepare an adhesive film.

Each of the adhesive layers was separated from the release films, and relaxation modulus was measured at different temperatures (−20° C., −10° C., 0° C. and 70° C.) using a rheometer (Anton Paar Co., MCR-302). Herein, a normal force and a shear stress were set up to be 1N and 70 kPa, respectively. Relaxation modulus values at an initial measurement and after 4 hours were obtained, and variations in these values are shown in Table 2 below.

2. Assessment of Thermal-Shock Durability

After placing the fabricated polarizing plate in a thermal-shock oven (ESPEC Co., TSE-11A), a condition of the polarizing plate after thermal-shock durability experiments by 100 cycles was monitored, and the durability was assessed according to the following standards.

1) Delamination at adhered surface: visible observation of bubbles/delamination at an adhered surface of the glass plate/adhesive/polarizing plate binder
○: not visible
Δ: bubbles visible
X: occurrence of delamination in entire surface 2) Fracture of polarizing plate in an MD direction: after positioning the polarizing plate on a rear surface of the glass plate/adhesive/polarizing plate binder in a direction perpendicular to the MD/TD direction, this was placed above a backlight to visibly observe light leakage due to fractures of the polarizing plate.
○: not visible
Δ: light leakage due to internal microfine cracks of polarizing plate visible (length of crack of 1 cm or less)
X: light leakage due to fractures visible in all MD direction

TABLE 2

| Section | Temperature (° C.) | Relaxation modulus | | | Thermal-shock reliability | |
|---|---|---|---|---|---|---|
| | | Initial (Pa) | After 4 hours (Pa) | Variation (%) | Delamination at adhered surface | Fracture of polarizing plate in MD direction |
| Example 1 | −20 | 2.71.E+05 | 2.24.E+04 | 91.7 | ○ | ○ |
| | −10 | 8.50.E+04 | 1.47.E+04 | 82.7 | | |
| | 0 | 4.32.E+04 | 1.07.E+04 | 75.2 | | |
| | 70 | 6.43.E+03 | 3.11.E+03 | 51.6 | | |

TABLE 2-continued

| Section | Temperature (° C.) | Relaxation modulus | | | Thermal-shock reliability | |
|---|---|---|---|---|---|---|
| | | Initial (Pa) | After 4 hours (Pa) | Variation (%) | Delamination at adhered surface | Fracture of polarizing plate in MD direction |
| Example 2 | −20 | 1.84.E+05 | 9.84.E+03 | 94.7 | ○ | ○ |
| | −10 | 9.20.E+04 | 1.04.E+04 | 88.7 | | |
| | 0 | 4.98.E+04 | 1.00.E+04 | 79.9 | | |
| | 70 | 5.67.E+03 | 2.71.E+03 | 52.2 | | |
| Example 3 | −20 | 1.29.E+05 | 1.70.E+04 | 86.8 | ○ | ○ |
| | −10 | 6.44.E+04 | 1.03.E+04 | 84.0 | | |
| | 0 | 3.98.E+04 | 9.00.E+03 | 77.4 | | |
| | 70 | 4.54.E+03 | 2.08.E+03 | 54.2 | | |
| Comparative Example 1 | −20 | 4.50.E+05 | 1.48.E+05 | 67.1 | ○ | X |
| | −10 | 4.31.E+05 | 1.38.E+05 | 68.0 | | |
| | 0 | 3.03.E+05 | 1.24.E+05 | 59.1 | | |
| | 70 | 9.50.E+04 | 4.69.E+04 | 50.6 | | |
| Comparative Example 2 | −20 | 2.12.E+05 | 3.20.E+03 | 98.5 | X | ○ |
| | −10 | 9.80.E+04 | 1.01.E+04 | 89.7 | | |
| | 0 | 5.46.E+04 | 1.05.E+04 | 80.8 | | |
| | 70 | 4.20.E+03 | 2.05.E+03 | 51.2 | | |
| Comparative Example 3 | −20 | 3.15.E+05 | 1.18.E+05 | 62.5 | ○ | X |
| | −10 | 3.02.E+05 | 1.29.E+05 | 57.2 | | |
| | 0 | 2.12.E+05 | 9.98.E+04 | 52.9 | | |
| | 70 | 6.65.E+04 | 3.07.E+04 | 53.8 | | |
| Comparative Example 4 | −20 | 4.12.E+05 | 1.24.E+05 | 69.9 | ○ | X |
| | −10 | 2.35.E+05 | 8.44.E+04 | 64.1 | | |
| | 0 | 1.98.E+05 | 7.40.E+04 | 62.6 | | |
| | 70 | 8.12.E+04 | 4.01.E+04 | 50.6 | | |
| Comparative Example 5 | −20 | 9.78.E+04 | 2.12.E+04 | 78.3 | ○ | X |
| | −10 | 5.41.E+04 | 1.87.E+04 | 65.4 | | |
| | 0 | 3.41.E+04 | 1.54.E+04 | 54.8 | | |
| | 70 | 1.21.E+04 | 5.91.E+03 | 51.2 | | |
| Comparative Example 6 | −20 | 3.45.E+05 | 1.08.E+05 | 68.7 | ○ | X |
| | −10 | 3.91.E+05 | 1.46.E+05 | 62.7 | | |
| | 0 | 2.74.E+05 | 1.20.E+05 | 56.2 | | |
| | 70 | 8.45.E+04 | 4.20.E+04 | 50.3 | | |

Referring to the above Table 2, all of the adhesive layers formed using the adhesive compositions of Examples 1 to 3 have a variation in relaxation modulus within a range of 75% to 95% before and after leaving the same at a temperature of −20° C., −10° C. and 0° C. for 4 hours, and therefore, delamination at adhered surface or fracture of the polarizing plate was not observed.

On the other hand, it was found that the adhesive compositions of Comparative Examples 1 to 7, in which since a variation in relaxation modulus of the adhesive layer are out of the above range, entailed delamination at adhered surface or fracture of the polarizing plate.

What is claimed is:

1. An adhesive layer for a polarizing plate, the adhesive layer having a variation in relaxation modulus in a range of 75% to 95% before and after leaving the adhesive layer at a temperature of −20° C. to 0° C. for 4 hours,
   wherein the adhesive layer has a variation in relaxation modulus of 40 to 70% before and after leaving the same at a temperature of 70° C. for 4 hours.

2. The adhesive layer of claim 1, wherein the adhesive layer has a thickness of 5 to 50 μm.

3. A polarizing plate comprising the adhesive layer of claim 1 which is formed on at least one surface of the polarizing plate.

4. The polarizing plate of claim 3, comprising:
   a polarizer;
   a protective film attached to at least one surface of the polarizer, and the protective film being an acryl-based film; and
   the adhesive layer formed on at least one side of the protective film.

5. An image display device comprising the polarizing plate of claim 3.

6. The image display device of claim 5, further comprising a liquid crystal panel, wherein the adhesive layer adheres the polarizer protective film to the liquid crystal panel.

7. The polarizing plate of claim 3, wherein the adhesive layer has a thickness of 5 to 50 μm.

8. The polarizing plate of claim 3, further comprising a liquid crystal panel, wherein the adhesive layer adheres the polarizer protective film to the liquid crystal panel.

9. The adhesive layer of claim 1, wherein the adhesive layer is formed of an adhesive composition comprising an acryl copolymer, cross-linking agent, and silane coupling agent.

10. The adhesive layer of claim 1, wherein the acryl copolymer is a copolymer of a (meth)acrylate monomer having an alkyl group with 1 to 12 carbon atoms, and a polymerizable monomer having a functional group capable of being cross-linked with a cross-linking agent, and the cross-linking agent is an isocyanate-based cross-linking agent.

* * * * *